United States Patent Office 3,516,166
Patented June 23, 1970

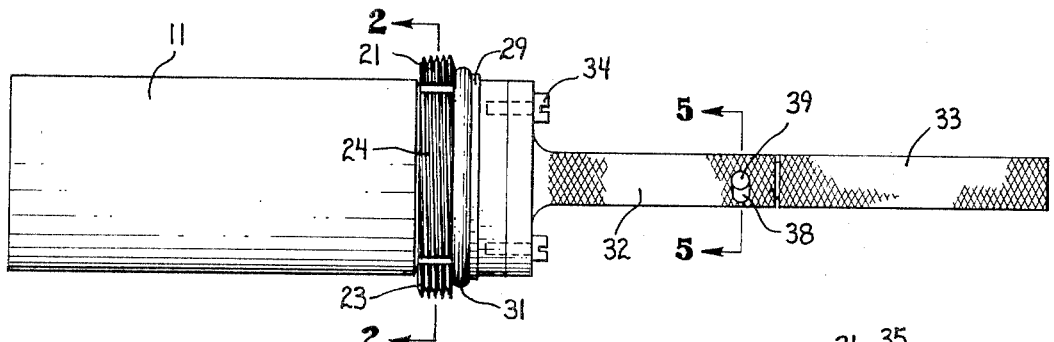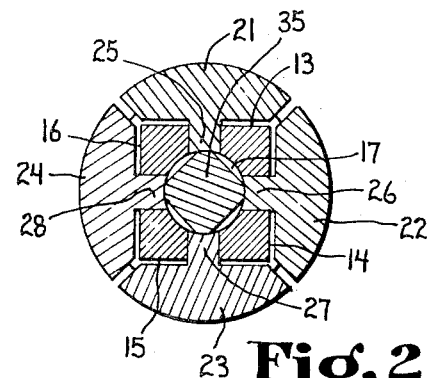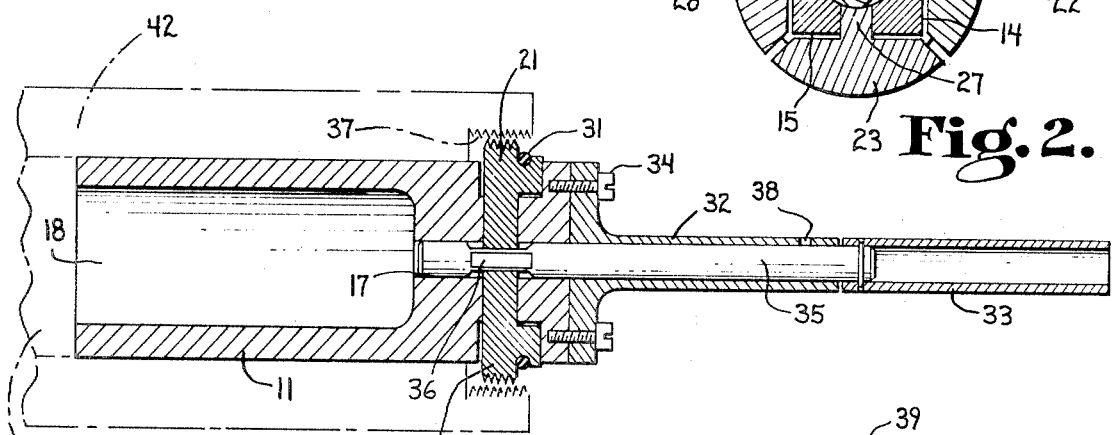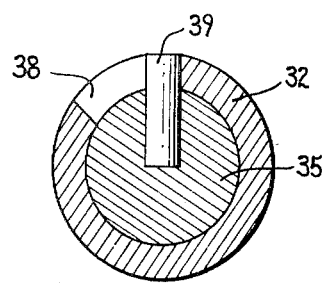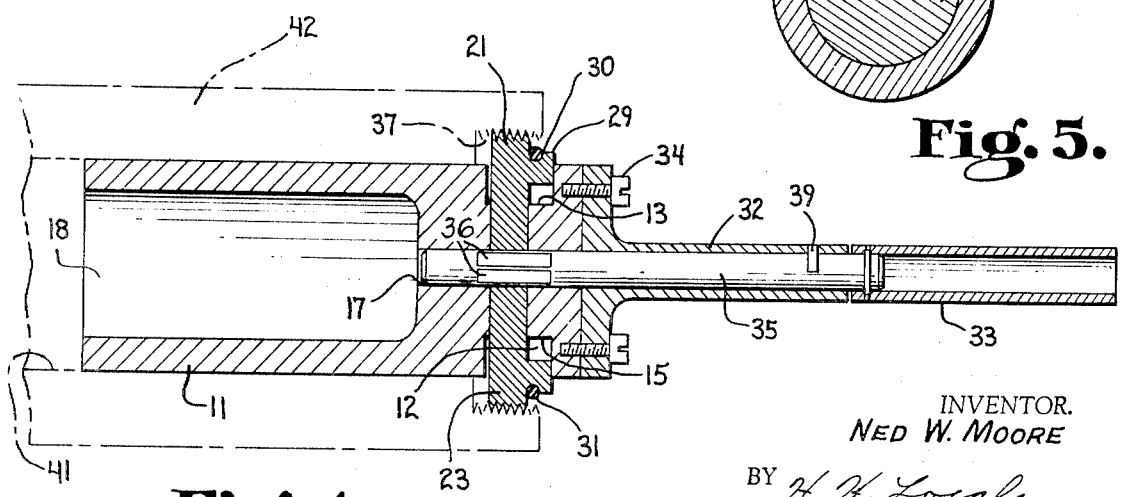
INVENTOR.
NED W. MOORE

3,516,166
INTERNAL THREAD GAGE
Ned W. Moore, 789 S. Main St., Linton, Ind. 47441
Continuation of application Ser. No. 657,736, July 31, 1967. This application Oct. 7, 1968, Ser. No. 785,834
Int. Cl. G01b 3/48
U.S. Cl. 33—199                      8 Claims

ABSTRACT OF THE DISCLOSURE

An internal thread gaging device having an elongated cylinder slotted to slidably mount a plurality of thread sections which are biased inwardly. A two-piece handle has one piece attached to one end of said cylinder and the second piece is rotatable within said first piece and has a cam surface for outwardly moving said thread sections.

---

This application is a continuation of 657,736, filed July 31, 1967, now abandoned.

Background of the invention

The present invention relates to an internal thread gage, and more particularly to a gage which will check the concentricity of two surfaces, one of which is threaded.

One heretofore generally used device for checking internal threads is comprised of a solid piece, hardened thread gage which is turned or rotated to fully mate threads to be checked. The use of this solid gage is not only time-consuming, but also continued use causes wear on the gage thereby causing the gage to be useless for further precision inspection.

Another device for checking internal threads is shown in U.S. Pat. 2,434,535, which issued Jan. 13, 1948, to John F. Anders. In this patented device, three toothed segments are provided, two of which are fixed with the third being radially movable in its space. A compression spring is provided to bias the radially movable tooth segment inwardly and an incline plane is provided on a slidable shaft to move the movable tooth segment outwardly.

Summary of the invention

In the present invention, an elongated cylinder is provided, and near one end a groove is cut that forms four flat surfaces. A hole is provided in each flat surface, and a threaded segment is slidably attached in each of these holes. A single coil spring is provided to inwardly bias each threaded segment. A two-piece handle is provided, one piece of which is attached to one end of the elongated cylinder. A shaft is attached to the other piece of the handle and is provided with a plurality of cam surfaces which engage with the threaded segments.

It is therefore a general object of the present invention to provide an internal thread gage which will rapidly check the concentricity of two surfaces, one of which is threaded.

Another object of the present invention is to provide an improved gage for checking internal threads.

Other objects and advantages of the present invention will be readily appreciated as the same becomes better understood by reference to the following detailed description when considered in connection with the accompanying drawing.

Brief description of the drawing

FIG. 1 is a plan view of a thread gage embodying the principles of the present invention;

FIG. 2 is a sectional view taken on line 2—2 of FIG. 1;

FIG. 3 is a longitudinal sectional view of a device of the present invention in a disengaging position;

FIG. 4 is a longitudinal sectional view of a device of the present invention in an engaging position with an internal thread; and FIG. 5 is an enlarged sectional view taken on line 5—5 of FIG. 1.

Description of the preferred embodiment

Referring now to the drawing, which depicts a preferred embodiment of the present invention, there is shown an elongated cylinder 11 which has a groove 12 near one end that forms four flat surfaces 13, 14, 15, and 16. A longitudinal bore 17 is provided in the end on which groove 12 is located and a larger bore 18 is provided at the other end. Bore 18 has no functional use and is provided only to lessen the weight of the gage.

A hole is provided in each of the four flat surfaces 13, 14, 15, and 16, with each hole extending into bore 17. A plurality of threaded segments 21, 22, 23, and 24 are provided, and each segment is provided with a cylindrical section that slidably engages in the holes in the four flat surfaces. As best shown in FIG. 2 of the drawing, threaded segment 21 has cylindrical section 25 which slides in the hole on flat surface 13, threaded segment 22 has cylindrical section 26 which slides in the hole on flat surface 14, threaded segment 23 has cylindrical section 27 which slides in the hole on flat surface 15, and threaded segment 24 has cylindrical section 28 which slides in the hole on flat surface 16.

Each threaded segment is provided with a flange 29 which has a semi-circular groove 30, and a single-turn coil spring 31 is seated in groove 30. Spring 31 biases each threaded segment inwardly. A handle, comprised of a fixed portion 32 and a rotatable portion 33, is provided with portion 32 being attached, as by screws 34, to one end of cylinder 11. The rotatable portion 33 of the handle is attached to a shaft 35 which is rotatable within fixed portion 32 and within bore 17 of cylinder 11. Shaft 35 is provided with four flat sections 36 which are ground or cut thereon ninety degrees apart. As best shown by FIGS. 2 and 4 of the drawing, these figures show the circular sections of shaft 35 engaging the four cylindrical sections of the threaded segments, and the threaded segments are extended so that they engage with an internal thread 37 to be checked. It can readily be seen that when portion 33 of the handle is rotated forty-five degrees, flat portions 36 on shaft 35 are engaged with the cylindrical sections on the threaded segments and spring 31 causes threaded segments to be biased inwardly, as shown in FIG. 3 of the drawing.

As best shown in FIGS. 1 and 5 of the drawing, fixed portion 32 of the handle is provided with a slot 38, and a stop pin 39, which is pressed-fitted into shaft 35, passes into slot 38. The length of slot 38 is such that shaft 35 can be rotated forty-five degrees. In one position, that which is shown in FIGS. 4 and 5 of the drawing, the threaded segments are fully extended, and when shaft 35 is rotated forty-five degrees, stop pin 39 moves to the other end of slot 38, thereby preventing further rotation of shaft 35, and in this position, the flat portion 36 on shaft 35 are engaged with the cylindrical sections on the threaded segments, and the threaded segments are retracted, as shown in FIG. 3 of the drawing.

In operation, assuming the concentricity of two surfaces is to be checked, one of which is threaded, the outer diameter of cylinder 11 is chosen so that it will be a close slip fit in the bore 41 of a work piece 42 being checked. With threaded segments 21 through 24 being retracted by spring 31, as shown in FIG. 3, the gage is inserted into work piece 42. With the gage being fully seated, handle portion 33 is then rotated forty-five degrees until stop pin 39 reaches the end of slot 38. In this position, which is shown in FIG. 4 of the drawing, the circular sections of shaft 35 are engaged with the ends of the cyliidrical sections of the threaded segments, and each threaded segment is extended to engage the internal threads 37 of work piece 42. It can be seen that four arcuate surfaces are formed by the flat surfaces 36 on shaft 35 and that these four arcuate surfaces serve to provide four cam surfaces and upon rotation of shaft 35, these arcuate surfaces and flat surfaces cause the threaded segments to be extended and retracted.

After a determination has been made as to the quality of work piece 42, shaft 35 is rotated forty-five degrees in an opposite direction, and spring 31 causes the four threaded segments to retract. The gage can then be withdrawn from work piece 42.

It should be understood, of course, that the foregoing disclosure relates to only a preferred embodiment of the invention and that numerous modifications and variations may be made without departing from the spirit and the scope of the invention as set forth in the appended claims.

What is claimed is:

1. A thread gage comprising: a cylinder having an axial bore therein and having a continuous circumferential groove in the periphery thereof extending perpendicular to the axial bore with the bottom of said groove forming a first pair of parallel flat surfaces and a second pair of parallel flat surfaces perpendicular to said first pair of parallel flat surfaces, a hole extending from each flat surface radially through said body perpendicular to and communicating with said bore in said cylinder, a plurality of threaded segments equal in number to the number of said flat surfaces, said threaded segments being guided by the wall of the groove and extending outwardly from said groove, each said threaded segment having a cylindrical portion slidable one each in each said hole extending from said flat surfaces, a shaft rotatably mounted in said bore of said cylinder, said shaft having four flat portions thereon with the surfaces between adjacent flat portions being arcuate cam surfaces, spring means for biasing said cylindrical portions of said plurality of threaded segments against said flat portions and said arcuate cam surfaces on said shaft, and means for rotating said shaft.

2. A gage comprising: a member having a bore and an external perimetrally extending continuous groove formed therein, axially spaced apart side walls of said groove lying respectively in planes perpendicular to the axis of said bore, said member also being formed with a plurality of spaced apart and radially extending holes, each hole communicating between the bottom of said groove and said bore, a plurality of peripherally elongate segments serially arranged in said groove, one segment associated with each of said holes and having a radially inwardly extending portion slidable therein, each segment being guided by said side walls for radial movement between the above-said planes, cam means for moving each of said segments radially outwardly, said cam means being operatively disposed in said bore, and spring means for biasing said radially inwardly extending portions against said cam means.

3. The gage of claim 2 in which said segments substantially entirely circumscribe said groove.

4. A gage comprising: a cylindrical member having an axially extending bore and an external peripherally extending continuous groove formed thereabout, said groove defining axially spaced apart side walls lying respectively in planes perpendicular to the axis of said bore, said member also being formed with a plurality of peripherally spaced apart and radially extending holes, each hole communicating between the bottom of said groove and said bore, a plurality of peripherally extending segments, one segment associated with each of said holes and having a radially inwardly extending portion slidable therein, a radially intermediate portion of each segment being received between and guidingly engaged by the side walls of said groove, a shaft journalled in said bore and providing cam means for engaging each of said radially inwardly extending portions, spring means for biasing said radially inwardly extending portions against said cam means, and said shaft being rockable to move said segments radially outwardly in opposition to said spring means, thereby to project a radially outer portion of each segment beyond the confines of the groove.

5. The gage of claim 4 including stop means for limiting the rocking movement of said shaft.

6. The gage of claim 4 in which said segments substantially entirely peripherally circumscribe sasd groove.

7. A gage for checking two internal surfaces of a work piece wherein the first surface is threaded and concentric with the second surface, the gage comprising: a body including a cylindrical portion adapted to be closely fit into the second surface of such a work piece, said body including another portion having a bore therein axially aligned with said cylindrical portion, an annular groove about said body and a plurality of circumferentially disposed radially extending holes connecting said annular groove and said bore, a plurality of segments disposed in said annular groove, said segments having threading at their outer extremity and a section extending through said radially extending holes to said bore, a shaft rockably disposed within said bore and having cam means thereon for moving said segments radially outwardly whereby said threading thereon moves into engagement with the first surface of such a work piece for checking the threading and concentricity thereof with respect to the second internal surface.

8. A gage for checking internal threading of a work piece comprising:
a body member having an axial bore,
said body further having an annular guide portion thereabout which lies in a plane perpendicular to the axis of said axial bore,
a plurality of holes radially directed from said axial bore to adjacent said annular guide portion,
a plurality of peripherally extending thread engaging segments arranged in substantial end-to-end relationship around said body member adjacent said annular guide portion,
said segments having shank portions slidably disposed in said radially directed holes and having an inner extremity extending at least partially into said axial bore,
spring means urging said segments radially inwardly,
a shaft rockably mounted in said axial bore and having cam means thereon for contacting said inner extremity of said shank,
said shaft upon rocking movement adapted to move said segments outwardly in opposition to said spring means for checking internal threading of a work piece.

References Cited

UNITED STATES PATENTS

| | | |
|---|---|---|
| 2,249,954 | 7/1941 | Hellberg et al. |
| 2,340,428 | 2/1944 | Ramsdell. |
| 2,595,917 | 5/1952 | Bath et al. |
| 2,781,585 | 2/1957 | Stalhandske et al. |
| 2,782,521 | 2/1957 | Parker et al. |

FOREIGN PATENTS

| | | |
|---|---|---|
| 113,536 | 2/1918 | Great Britain. |
| 568,301 | 3/1945 | Great Britain. |

HARRY N. HAROIAN, Primary Examiner